United States Patent [19]
Besoyan

[11] 3,880,262
[45] Apr. 29, 1975

[54] CONTROL MEANS FOR AUXILIARY BRAKE DEVICE

[75] Inventor: Kirk Besoyan, Blythe, Calif.

[73] Assignee: Auxiliary Brake Systems, Inc., Phoenix, Ariz.

[22] Filed: Jan. 3, 1974

[21] Appl. No.: 430,571

[52] U.S. Cl. ............ 188/77 R; 188/106 P; 188/162; 192/80
[51] Int. Cl. ............................................. F16d 49/08
[58] Field of Search ............. 188/77 R, 106 P, 162; 192/80

[56] References Cited
UNITED STATES PATENTS

| | | | |
|---|---|---|---|
| 1,434,022 | 10/1922 | Peed | 188/77 R |
| 2,955,680 | 10/1960 | Caero | 188/77 R |
| 3,353,634 | 11/1967 | Farrar | 188/162 X |
| 3,516,519 | 6/1970 | Besoyan | 188/77 R |
| 3,638,766 | 2/1972 | Besoyan | 188/106 P |

*Primary Examiner*—George E. A. Halvosa
*Attorney, Agent, or Firm*—Watson, Cole, Grindle & Watson

[57] ABSTRACT

An auxiliary brake device comprises a flexible cable extending partially about a pair of sheaves secured to opposite ends of a vehicle axle, friction elements being carried by the cable and engaging the sheave walls for braking the vehicle as the cable is drawn tight, a control device is also included for automatically and manually tightening the cable about each sheave with an equalizing force in both a forward and a reverse direction of vehicle motion.

4 Claims, 7 Drawing Figures

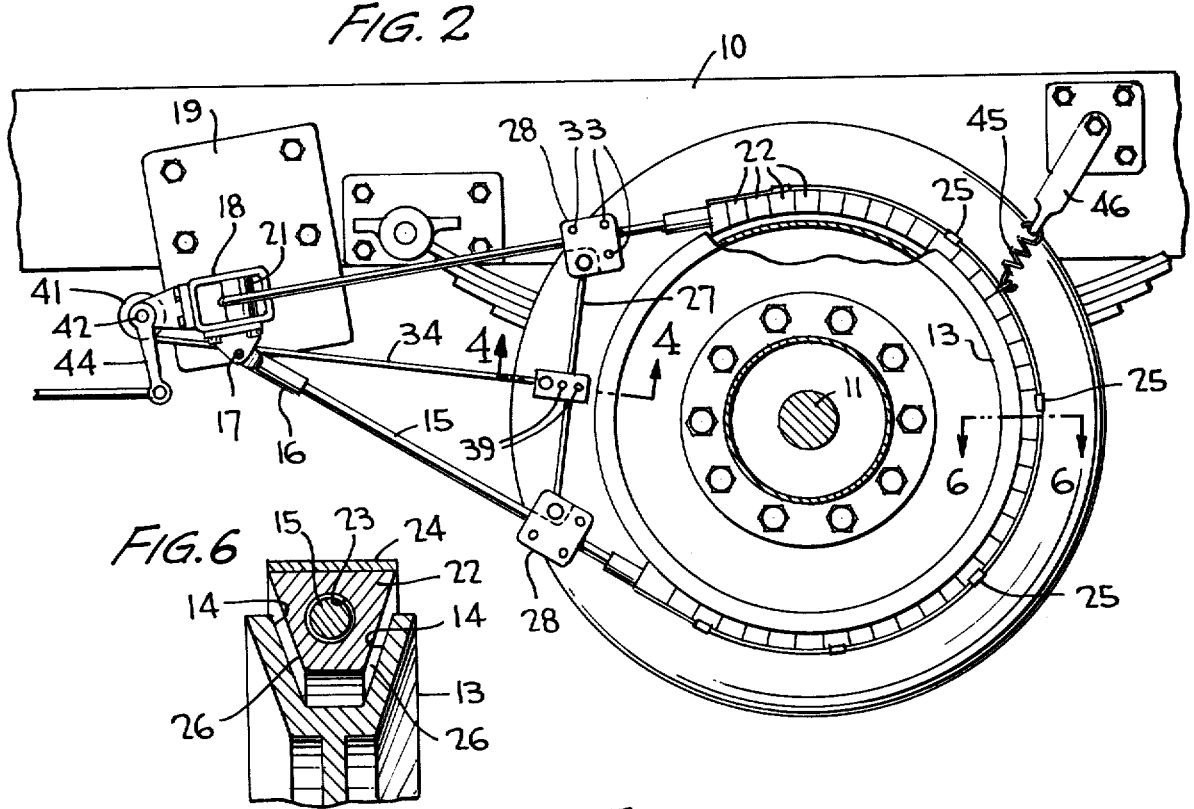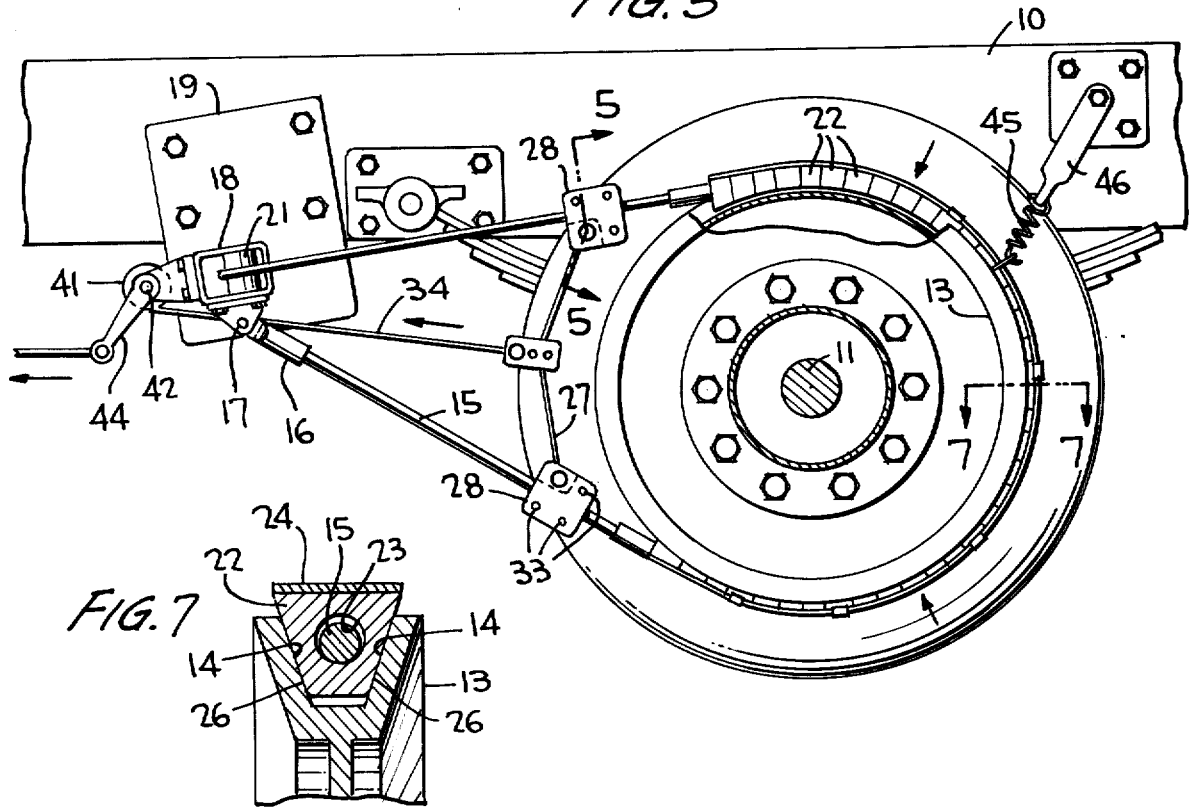

CONTROL MEANS FOR AUXILIARY BRAKE DEVICE

This invention relates generally to a vehicle braking device, and more particularly to a means for applying an auxiliary brake in a manner which provides an equal braking force about a braking surface.

In U.S. Pat. No. 3,516,519 issued June 23, 1970 for an Auxiliary Brake and Braking System and commonly owned herewith, a brake system is disclosed as being operable independently of the vehicle's ordinary service brakes and being applicable as an auxiliary piece of braking equipment for the vehicle. Such a system includes a flexible cable extending about the sheave mounted at opposite ends of the vehicle axle thereby acting as auxiliary brake drums so that braking elements, which are carried by the flexible cable, may be made to frictionally engage with the walls of the sheave groove when the cable is drawn tight. The flexible cable and its friction elements may be automatically moved toward and away from the vehicle axle by means of a reversible motor operatively connected thereto. Upon actuation of such motor, each end of the flexible cable is moved in relation to the vehicle axle so as to move the cable either toward or away from the sheave groove thereby respectively engaging and disengaging the friction elements with the side walls of the sheave groove.

In another U.S. Pat. No. 3,638,766, commonly owned herewith, and issuing on Feb. 1, 1972 for Manual Control for Auxiliary Brake System, a manual control means for optionally operating an automatic control to actuate the cable for applying the brake in the event of automatic control failure is disclosed therein. Again, each end of the flexible cable is moved relative to the vehicle axle so as to effect movement of the cable and the friction elements carried thereon toward and away from the sheave groove to thereby respectively engage and disengage the friction elements with the side walls of such groove. Although such auxiliary brake as described in both these patents is highly effective in stopping moving vehicles for which they are intended, certain areas of improvement have become desirable. For example, movement of each end of the cable toward and away from the vehicle axis is effective as an auxiliary brake means in stopping a moving vehicle, although use thereof as a parking brake will tend to effect an unequal braking force against both a forward and a reverse direction of vehicle movement as the friction elements adjacent the free ends of the flexible cable tend to more positively engage the side walls of each sheave groove as compared to such engagement effected by the friction elements farther away from the cable ends. Adaptation of these auxiliary brake systems with a manual control for parking situations does not alone provide an adequate solution.

It is therefore the principal object of the present invention to provide a control means to actuate the cable for applying the brake with a self-equalizing force about each sheave in both a forward and a reverse direction of vehicle movement as both a parking brake and as an auxiliary braking system.

Another object of this invention is to provide such a control means which is easy to operate, economical to manufacture and simple in construction yet highly effective in either automatically braking a motor vehicle or in manually actuating the brake in the absence of automatic power as during a parking situation where braking control is required in both a forward and reverse direction.

A further object of this invention is to provide such an auxiliary braking device in which a plurality of friction elements are carried by a flexible cable extending about a sheave located at opposite ends of the vehicle axle which form brake drums with which the friction elements make equal frictional engagement when the cable is tightened, the means for equalizing the cable force being a centralized cable pull arrangement operatively associated with portions of the cable.

A still further object of this invention is to provide such a braking device wherein the braking forces are automatically translated to each end of the cable so that, upon rotation of a cable drum to which the centralized cable is attached, the flexible cable will be effectively tightened about both sheaves for braking the vehicle with a self-equalizing force from wheel to wheel.

A still further object of this invention is to provide such an auxiliary braking device wherein the manual cable moving means is a rotary drum in engagement with an electric motor to effect automatic rotation and further in engagement with a crank lever arm for manually rotating same, the centralized cable being affixed to the rotary drum as a means for actuation of the control means upon rotation thereof.

Other objects, advantages and novel features of the invention will become more apparent from the following detailed description of the invention when considered in conjunction with the accompanying drawings wherein:

FIG. 2 is a side elevational view of the arrangement of FIG. 1 showing the details of the present invention;

FIG. 3 is a view similar to FIG. 2 showing the manner in which the control means operates the auxiliary brake device according to the invention.

FIG. 6 is a cross-sectional view of one of the frictional elements carried by the flexible cable shown out of engagement with the opposite side walls of the sheave groove, taken along line 6—6 of FIG. 2; and FIG. 7 is a view similar to FIG. 6 showing one of the friction elements in engagement with the opposite side walls of the sheave groove, taken along line 7—7 of FIG. 3.

Figure 1:
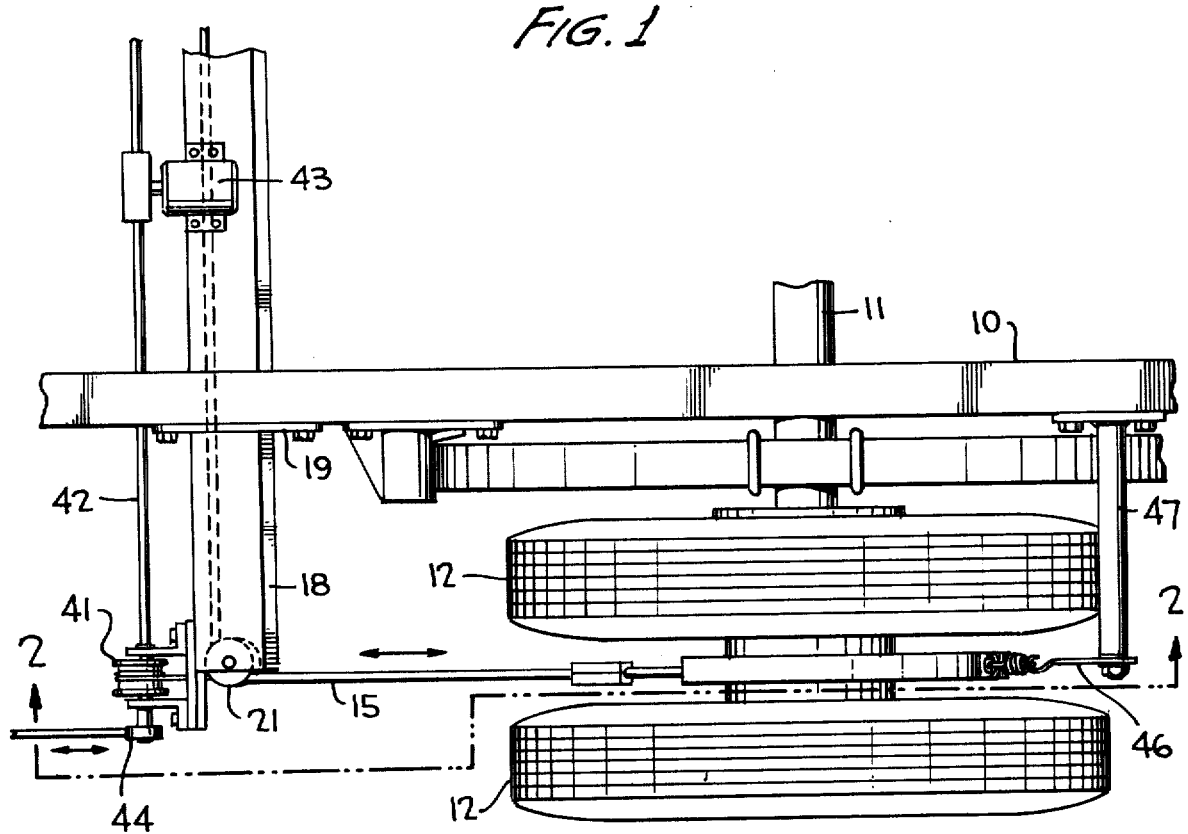
FIG. 1 is a top plan view showing dual wheels mounted at one end of a vehicle axle and incorporating the control means for the auxiliary brake device of the present invention.

Turning now to the drawings wherein like reference characters refer to like and corresponding parts throughout the several views, a portion of a vehicle is shown in FIG. 1 as having a frame 10 with an axle 11 carried by the frame and a pair of dual wheels 12 mounted at one end of the axle. Another pair of such wheels is mounted at the other end of axle 11 in the same manner although such is omitted from the showing in FIG. 1 for the sake of clarity.

In a manner similar to that disclosed in the aforementioned prior patents, a sheave 13 is mounted concentrically on each wheel for rotation therewith, each sheave having opposite side walls 14 sloping inwardly toward one another and forming an annular sheave groove in the manner shown in FIGS. 6 and 7. A flexible cable 15 extends about both sheaves over at least 180° of each sheave circumference. One end 16 of this flexible cable is pivotally mounted as at 17 to the underside of an elongated transverse tubular element 18 mounted to the longitudinal side frame members of the vehicle by means of mounting plates 19. That portion of flexible cable 15 lying between the sheaves extends through element 18 which extends across the vehicle side frame members. A friction roller 21 mounted near each end of the tubular element are each provided to accommodate that portion of the flexible cable extending therethrough.

Similarly as in the aforementioned prior patents, a plurality of friction elements 22, each having a central opening 23 extending therethrough, are carried by flexible cable 15 throughout the cable's extent about the sheave. A resilient backing plate 24 secured to the friction elements as by suitable clamps 25 is also provided. Each of the friction elements 22 has opposite side walls 26 sloping inwardly and toward one another to the same degree as inwardly sloping side walls 14 of the sheave.

Figure 5:
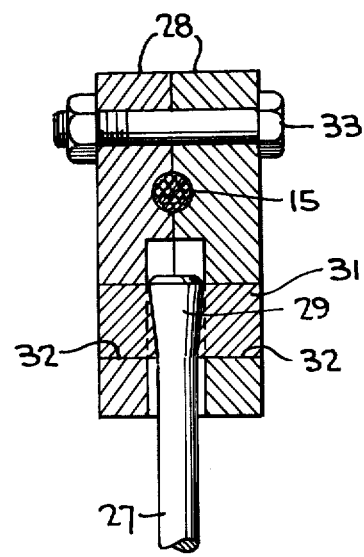
FIG. 5 is a detail sectional view showing a typical connection of the flexible elements connected at opposite ends to portions of the flexible cable, taken along the line of 5—5 of FIG. 3.

The control means for moving flexible cable 15 so as to draw friction elements 22 into and out of frictional engagement with side walls 14 of each sheave groove generally includes a short flexible cable 27 extending between and secured to portions of flexible cable 15 lying just outwardly of each sheave as shown in FIG. 2. This short length of cable is mounted in place as by means of cooperating bracket plates 28 shown in FIG. 5 as the means for mounting opposite ends of cable 27, respectively, to those portions of flexible cable 15 lying outwardly of each sheave. Opposite ends of cable 27 are outwardly flared as at 29 and are welded or otherwise secured at such flarings to anchor pieces 31. Each anchor piece is suitably located within aligned openings 32 provided in bracket plates 28 and the latter may be secured together as by nut and bolt fasteners 33.

Figure 4:
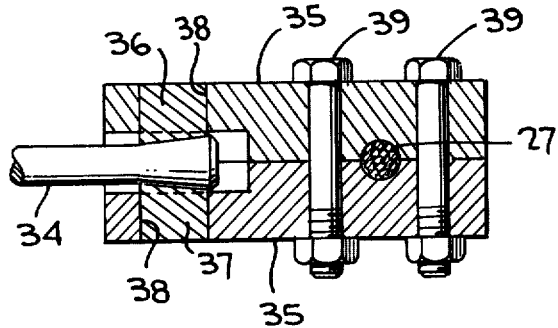
FIG. 4 is a detail view showing the interconnection between the central pull cable and the flexible element which interconnects portions of the cable for each sheave, taken along line 4—4 of FIG. 2.

The control means further includes a flexible central pull cable 34, one end of which being secured to cable 27 centrally between its ends by means of bracket plates 35 shown in FIG. 4. Means for securing this central pull cable 34 in place is similar to that described for cable 27 shown in FIG. 5. That is, an end of cable 34 is flared as at 36 at which it is welded or otherwise secured to an anchor piece 37 located within aligned openings 38 of plate 35. The plates are secured together over cable 27 by means of nut and bolt fasteners 39.

The opposite end of cable 34 is secured to a cable drum 41 which is mounted on its axle 42 for rotation therewith, the drum and its axle both being mounted on transverse tubular element 18 as seen in FIG. 1. Also shown in this Figure is a reversible electric motor 43 operatively interconnected with shaft 42 for rotation thereof. A crank arm 44 is likewise connected to shaft 42 so that, upon rotation of the shaft either by means of the motor or by movement of the crank in the direction of the arrow shown in FIG. 3, cable drum 41 is likewise rotated so as to move cable segment 34 in the direction of its arrow shown in FIG. 3. Accordingly, cable 15 is tightened about each sheave as the distance between securing plates 28 are moved slightly toward one another when cable 27 is pulled toward the cable drum, as in FIG. 3. The brake is thereby applied as friction elements 22 are moved into frictional engagement with side walls 14 of each sheave 13. Reverse rotation of the cable drum so as to return cable 27 to its straight position of FIG. 2 effects a release of the braking action as the friction elements move out of contact with opposite side walls 14 of the sheave groove. Such movement is assured by means of a coil spring 45 secured at one end to backup plate 24 and at its other end to an arm 46 mounted to frame 10 by means of a stud 47 shown in FIG. 1.

In operation, the brake is simply applied by rotating shaft 42 so as to accordingly rotate cable drum 41 mounted thereon. During such rotation, cable segment 34 is slightly wound up on the cable drum and moves in the direction shown by its arrow in FIG. 3. Cable 27 is likewise pulled in that direction and forms an angle greater than 90° with cable 34 on opposite sides of its central portion. Accordingly, the opposite ends of cable 27 are moved slightly toward one another to thereby inwardly move those portions of flexible cable 15 to which cable 27 is secured. The flexible cable 15 is therefore tightened about its sheave so as to substantially equalize the frictional engagement between elements 22 and the side walls of the sheave groove, as these elements are moved into frictional engagement therewith (see FIG. 7). Reverse rotation of shaft 42 and its cable drum 41 serves to unwind cable 34 from the drum to thereby return cable 27 to its straight position of FIG. 2. Opposite ends of this cable therefore move slightly outwardly away from one another to thereby release some of the tension from flexible cable 15 during the brake release. Accordingly, friction elements 22 are moved outwardly away from side walls of the sheave groove as in FIG. 6 and are assisted during such movement by means of coil spring 45.

In the event of a failure of the vehicle's service brakes, electric motor 43 may be operated to rotate shaft 42 to apply the auxiliary brake device of the invention in bringing the vehicle to a safe and complete stop. However, should both the service brakes, reversible electric motor or the entire electrical power system fail to operate, shaft 42 may nevertheless be rotated by means of crank arm 44 moved in the direction of its arrow shown in FIG. 3 so as to effectively operate the auxiliary brake system of the invention. Moreover, during a parking situation, crank arm 44 may be moved in the direction of its arrow shown in FIG. 3 so as to effectively apply the auxiliary brake with an equalizing force on each sheave in both a forward and reverse direction of vehicle movement. In other words, since both portions of flexible cable 15 extending away from each sheave are moved toward one another as the auxiliary brake is applied, friction elements 22 will be more equally placed into frictional engagement with the side walls of each sheave groove to thereby safely brake the vehicle against rotational movement of the wheels in either direction.

Obviously, many modifications and variations of the present invention are possible in the light of the above teachings. It is therefore to be understood that within the scope of the appended claims, the invention may be practiced otherwise than as specifically described.

What is claimed is:

1. An auxiliary brake device for a vehicle having a frame, an axle carried by said frame, a wheel at opposite ends of said axle comprising, in combination, a sheave secured relative to and concentric with each said wheel for rotation therewith, a flexible cable extending about said sheaves over at least 180° of each sheave circumference, said cable being movable toward and away from the bottom of each sheave groove, a plurality of friction elements carried by said cable into and out of frictional engagement with the side walls defining the groove of each said sheave, and control means for moving said cable to draw said friction elements into and out of frictional engagement with each said sheave groove side walls with an equalizing force in both a forward and reverse direction of vehicle motion, said control means comprising a first flexible cable element interconnecting at its opposite ends portions of said cable extending away from each said sheave near the remainder of each sheave circumference, a cable drum rotatably mounted on said frame about an axis parallel to said vehicle axle, and a second flexible cable element mounted at one end to the periphery of said drum and mounted at its opposite end to said first cable element substantially midway between said interconnected cable portions, thereby the auxiliary brake may be applied upon rotation of said cable drum in one direction causing said cable portions to be moved toward one another to thereby equally draw said friction elements into frictional engagement with each said sheave groove side walls during forward and reverse directions of vehicle motion, said first flexible cable element flexing between its said ends as said second cable element is moved away from said sheave to thereby move said opposite ends toward one another.

2. The auxiliary brake device of claim 1 wherein a reversible electric motor is operatively interconnected with said cable drum for automatically rotating same.

3. The auxiliary brake device according to claim 1 wherein a crank arm is operatively mounted on said cable drum for manually rotating same.

4. The auxiliary brake device according to claim 1 further including spring means interconnecting said flexible cable in the vicinity of its extension over said sheave circumference with said frame for insuring movement of said friction elements out of frictional engagement with each said sheave groove side walls when the auxiliary brake is not applied.

* * * * *